(12) United States Patent
Rowson et al.

(10) Patent No.: US 9,608,331 B1
(45) Date of Patent: Mar. 28, 2017

(54) SAR REDUCTION ARCHITECTURE AND TECHNIQUE FOR WIRELESS DEVICES

(75) Inventors: Sebastian Rowson, San Diego, CA (US); Laurent Desclos, San Diego, CA (US); Jeffrey Shamblin, San Marcos, CA (US); Abhishek Singh, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 775 days.

(21) Appl. No.: 13/608,988

(22) Filed: Sep. 10, 2012

Related U.S. Application Data

(60) Provisional application No. 61/532,456, filed on Sep. 8, 2011.

(51) Int. Cl.
*H01Q 9/04* (2006.01)
*H01Q 9/42* (2006.01)
*H01Q 9/16* (2006.01)

(52) U.S. Cl.
CPC ............. *H01Q 9/16* (2013.01); *H01Q 9/0442* (2013.01); *H01Q 9/42* (2013.01)

(58) Field of Classification Search
CPC ............................... H01Q 9/0442; H01Q 9/42

USPC .......................................................... 343/747
See application file for complete search history.

(56) References Cited

U.S. PATENT DOCUMENTS

| 7,405,701 | B2 * | 7/2008 | Ozkar ........................... 343/702 |
| 2004/0169613 | A1 * | 9/2004 | Krier et al. .................... 343/783 |
| 2004/0248523 | A1 * | 12/2004 | Nishimura ............. H01Q 1/245 455/78 |
| 2009/0046028 | A1 * | 2/2009 | Han .......................... H01Q 1/38 343/787 |
| 2009/0224991 | A1 * | 9/2009 | Rowson et al. ............... 343/747 |

* cited by examiner

*Primary Examiner* — Hoang V Nguyen
*Assistant Examiner* — Michael Bouizza
(74) *Attorney, Agent, or Firm* — Costal Patent Law Group, P.C.

(57) ABSTRACT

A modal antenna is proposed that provides for dynamic tuning and optimization of antenna system parameters for SAR (Specific Absorption Rate) management in mobile wireless devices. A modular approach is described where the radiator and active components are integrated into a module, allowing the fixed radiator to be used across multiple wireless products and form factors. Multiple radiation modes can be generated by a single antenna structure with one or several of the modes designed to minimize SAR while maintaining efficient communication link performance. Proximity sensors or other sensors provide indicators to determine when mode selection is necessary.

16 Claims, 14 Drawing Sheets

IMD "M" type element:

IMD "M" type element with distributed tuning loop:

MODULAR APPROACH TO SAR ANTENNA SOLUTION

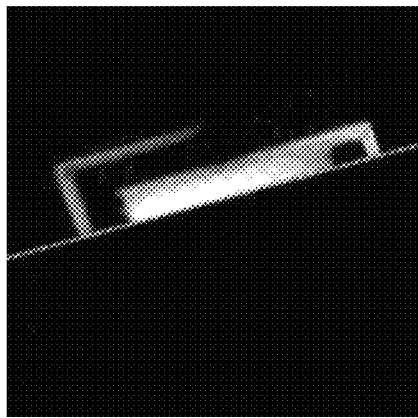 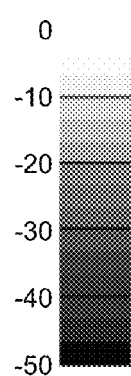 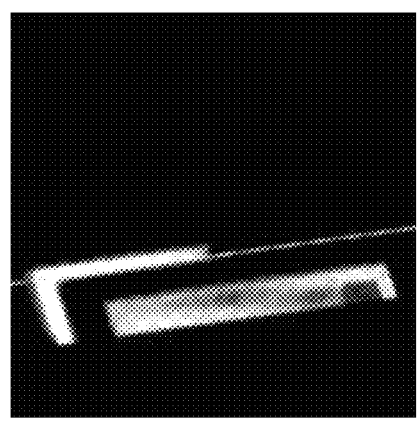
*FIG.8A*  *FIG.8B*
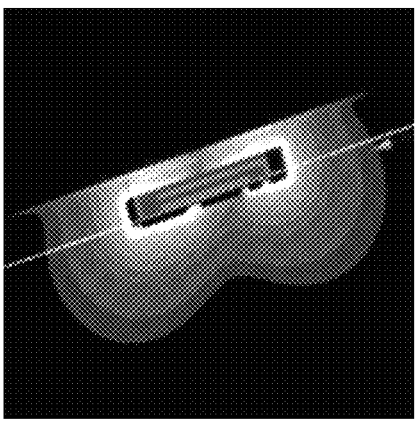 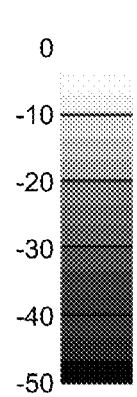 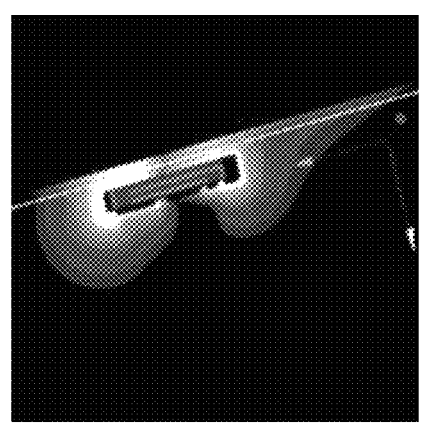
*FIG.8C*  *FIG.8D*

SAR REDUCTION ARCHITECTURE AND TECHNIQUE FOR WIRELESS DEVICES

CROSS-REFERENCE TO RELATED APPLICATIONS

This application claims benefit of priority with U.S. Provisional Application Ser. No. 61/532,456, filed Sep. 8, 2011; the contents of which are hereby incorporated by reference.

BACKGROUND OF THE INVENTION

Field of the Invention

The present invention relates generally to the field of wireless communication. In particular, the present invention relates to Specific Absorption Rate (SAR) reduction techniques and related antenna systems that preserve communication link performance while managing near-field radiation characteristics of antenna systems.

Related Art

Today's mobile wireless devices must meet a stringent set of requirements that relate to the radiated performance of the antenna system on the mobile side. These requirements cover parameters such as total radiated power (TRP), total isotropic sensitivity (TIS), specific absorption rate (SAR), and hearing aid compatibility (HAC). SAR tends to increase with increasing TRP, as well as interference which will cause HAC to fail to meet requirements. One method to reduce SAR in a wireless mobile device is to reduce the transmit power. This technique, unfortunately, results in reduced communication link quality caused by decreased transmit power.

Proximity sensors and other sensing devices are being integrated into current cell phones and other mobile wireless devices. This is typically done to serve such functions as powering down the display when the cell phone is placed against the user's head. This results in power savings which translates into increased battery life, an important parameter in mobile wireless devices. Another function enabled by proximity sensors is the reduction of transmit power of Tablet PCs when hand or body loading is sensed, which results in reduced SAR at the expense of radiated efficiency.

Commonly owned U.S. Pat. No. 7,911,402, issued Mar. 22, 2011, describes a Modal antenna capable of dynamically shifting frequency response and radiation pattern characteristics of the modal antenna; the entire contents of which are hereby incorporated by reference.

Commonly owned US pub. 2014/0099982, published Apr. 10, 2014, describes a modal adaptive antenna system, which uses an antenna radiation pattern beam steering technique to improve communication link quality between the mobile wireless device and the base terminal. This technique provides an antenna with multiple radiation pattern states, or modes, along with an algorithm to dynamically sample link performance and adjust the radiation pattern of the mobile antenna to improve communication link quality. This technique is designed to improve the communication link quality, which is a far-field parameter.

Commonly owned US pub. 2013/0127670, published May 23, 2013, describes a technique of dynamically sampling near-field properties derived from proximity sensors or other sensors integrated into a mobile device and use this information to modify the antenna radiation pattern of a modal antenna to improve communication link quality along with near-field parameters such as SAR. An algorithm and look-up table containing pre-measured electrical parameters to include TRP, TIS, and SAR are developed and integrated with hardware which includes an antenna and active components to dynamically modify the radiation pattern of the antenna as well as proximity sensors and or other sensing devices.

SUMMARY OF THE INVENTION

The invention includes techniques for designing and integrating a modular SAR antenna system into mobile devices to provide an antenna system with multiple radiating modes to select from in order to manage specific absorption rate (SAR). A modular antenna assembly consisting of an isolated magnetic dipole (IMD) antenna on a substrate provides an isolated antenna element that enables the modular technique, which brings flexibility to antenna integration and placement across a wide variety of devices. The module contains an IMD element along with a conductor attached to a dielectric support. An active component, such as a switch, is attached to the module and is used to vary the reactance at the conductor/ground plane interface. As the reactance at the conductor/ground plane interface is varied, the radiating mode is altered.

Additionally, active components can be coupled to the antenna element to alter the frequency response or impedance properties. The integration of active components to the antenna element provides the capability to dynamically adjust antenna parameters to compensate for changes to the local environment, such as the mobile device being placed close to the user's body or the user's hands being placed in the vicinity of the antennas integrated into or on the mobile device. The one or more components used to bring a tuning function to the antenna can be integrated into the matching circuit of the antenna at the feed point, or can be coupled to the antenna structure.

A further improvement to this antenna configuration is to remove portions of the ground plane beneath or in the vicinity of the antenna element and conductor, with the intent being to form a radiating aperture in the ground plane. The area of cleared ground can be enclosed by portions of the conductive ground plane; alternately, the cleared area can have a portion of the area that terminates along an edge of the circuit board that the ground plane is formed on.

Additional variations to the antenna topology described can be realized. The IMD antenna element can be changed to another radiator type such as a monopole, dipole, loop, planar inverted F-type antenna (PIFA), or inverted F-type antenna (IFA). The conductor can take many form factors such as a linear element elevated above the ground plane, a planar element elevated above the ground plane, or a three dimensional conductive structure.

BRIEF DESCRIPTION OF THE DRAWINGS

FIG. 8A shows current distributions on the IMD antenna and the parasitic element from a side view, with the antenna in a first mode of excitation wherein the parasitic element is open circuited.

FIG. 8B shows current distributions on the IMD antenna and the parasitic element from a side view, with the antenna in a second mode of excitation wherein the parasitic element is short circuited.

FIG. 8C shows current distributions on the IMD antenna and the parasitic element from a top view, with the antenna in the first mode of excitation wherein the parasitic element is open circuited.

FIG. 8D shows current distributions on the IMD antenna and the parasitic element from a top view, with the antenna in the second mode of excitation wherein the parasitic element is short circuited.

DESCRIPTION OF EMBODIMENTS

Figure 1:
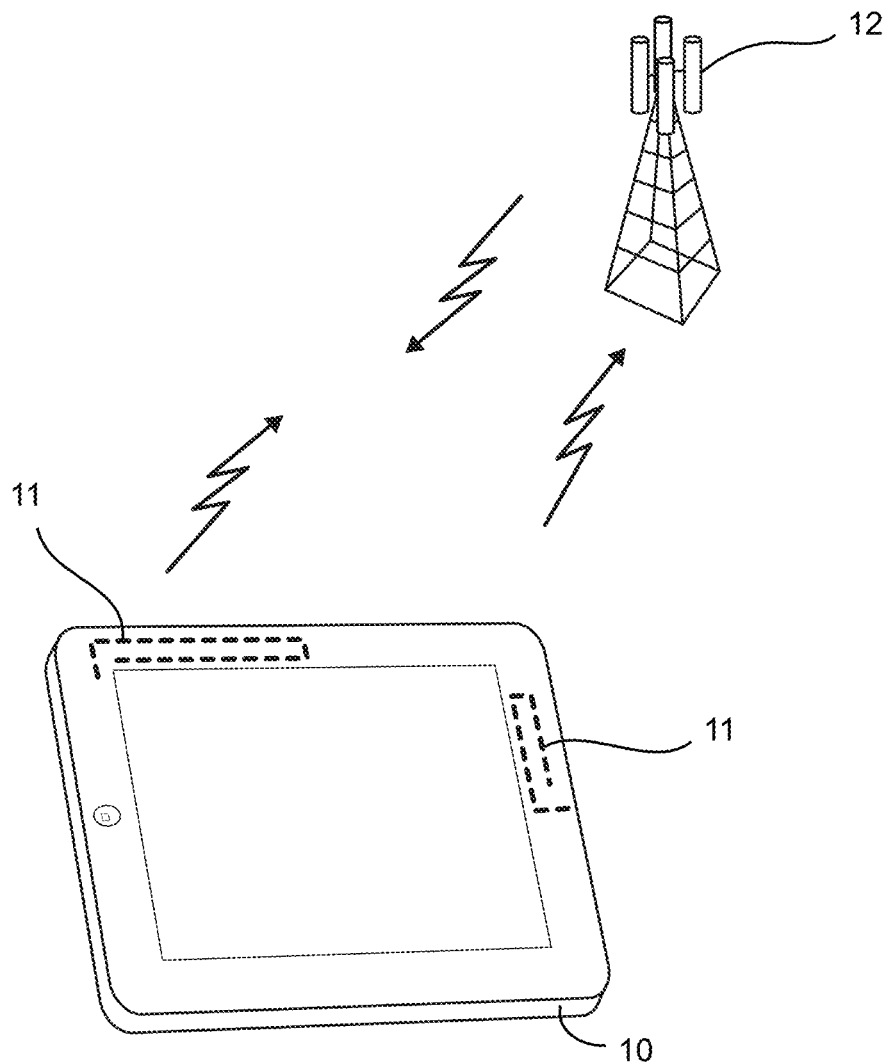
FIG. 1 shows a Tablet PC with integrated antennas.

Antennas of a tablet PC are often covered by a user's hands or body, presenting a challenge to maintain efficiency and reduce SAR when the tablet PC is in close proximity to the user. FIG. 1 illustrates a Tablet PC 10 with embedded antennas 11. A base terminal 12 is shown and one or both antennas in the Tablet are cellular antennas that transmit and receive RF signals from the base terminal.

Figure 2:
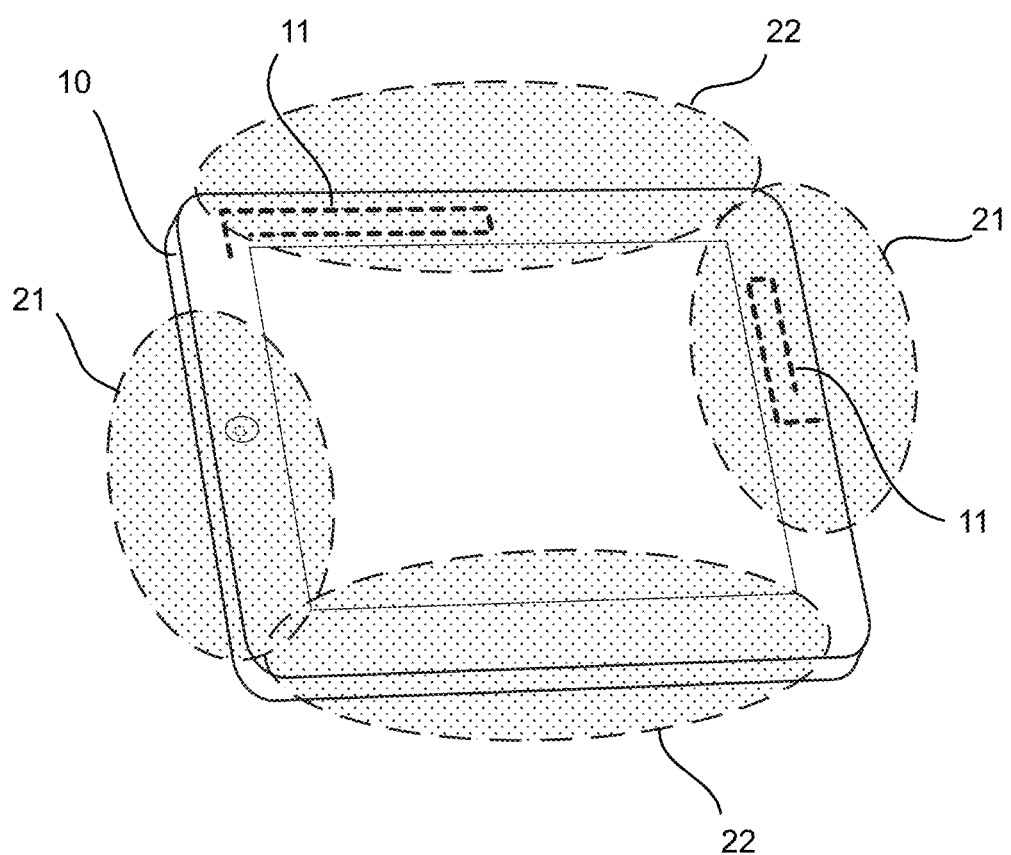
FIG. 2 shows typical regions on a Tablet PC where hand loading and body loading from the user occurs.

FIG. 2 illustrates typical regions on a Tablet PC where hand loading and body loading from the user occurs. Hand loading regions 21 are shown positioned on the right and left sides of the tablet PC 10; and body loading regions 22 are shown along the top and bottom sides of the tablet PC 10. Antennas 11 are shown positioned within the tablet PC along various sides thereof where hand and body loading tend to occur. The hand or body loading degrades antenna performance, with the result being reduced communication link performance. A portion of the radiated power is absorbed into the body of the user, resulting in a specific SAR level in regions of the user's body.

Figure 3:
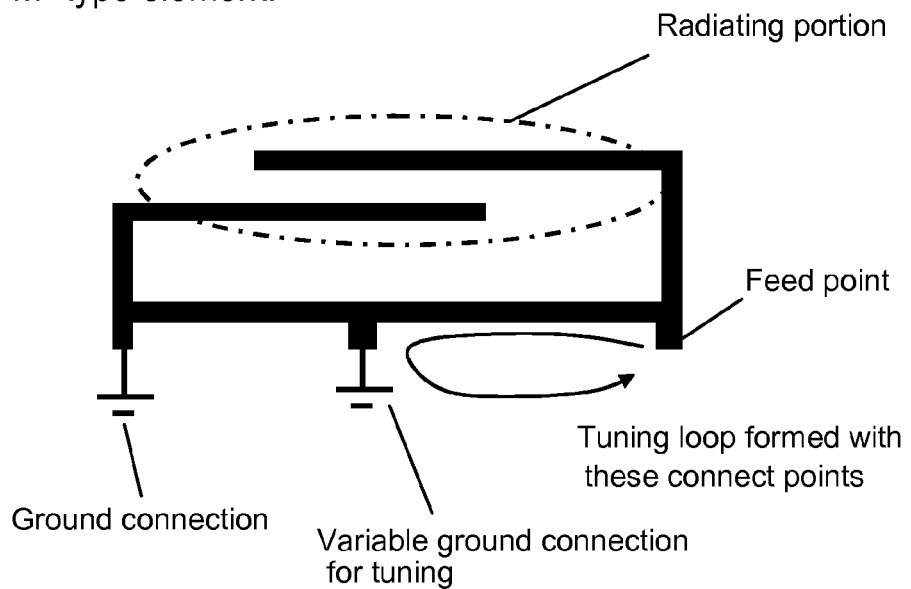
FIG. 3 shows an "M" type Isolated Magnetic Dipole (IMD) antenna.

FIG. 3 illustrates an "M" type Isolated Magnetic Dipole (IMD) antenna. The radiating portion 31 of the antenna structure is highlighted in broken lines, along with a tuning loop region 32 which is formed in the vicinity of the feed point 33 and variable ground point 35. The antenna further comprises a static ground connection 34 shown positioned on a bottom left corner of the M type IMD antenna. The static ground connection, variable ground point, and feed point form an "M" shape where the antenna couples to feed and ground.

Figure 4:
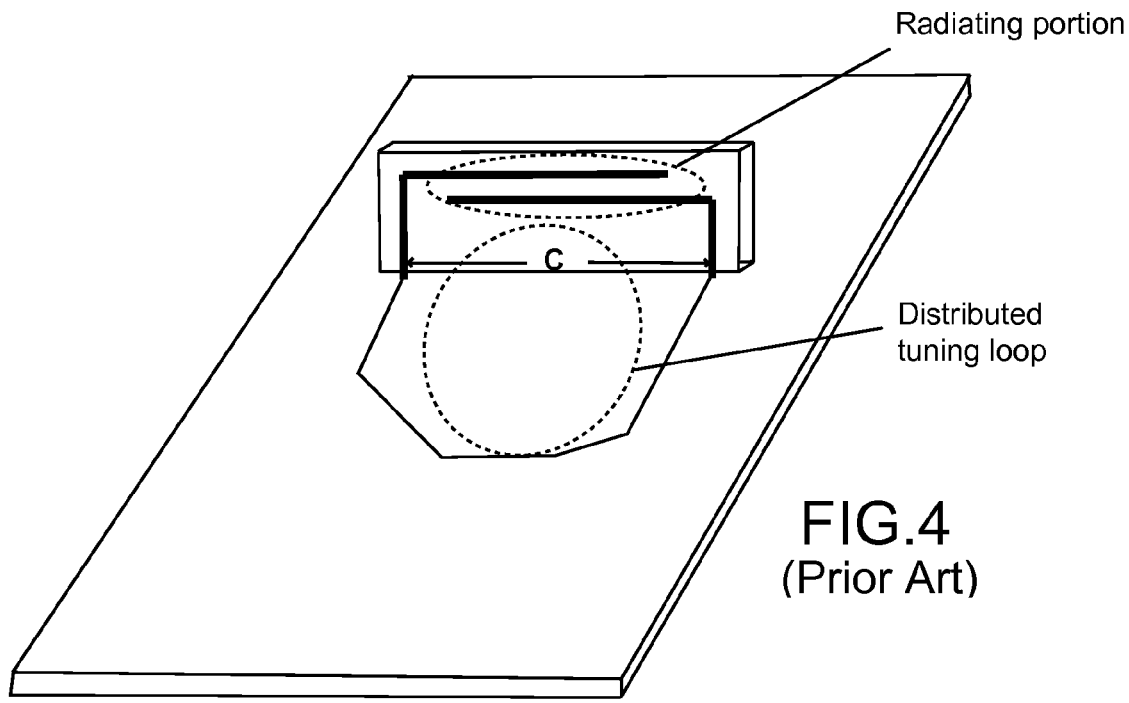
FIG. 4 shows an "M" type IMD antenna with a tuning loop that is distributed and located in the circuit board of the antenna.

FIG. 4 illustrates an "M" type IMD antenna where the tuning loop 43 is distributed and located in the circuit board 45 that the antenna is integrated onto. The M type IMD antenna comprises a radiating portion 41 formed about conductors positioned on a substrate 44, and an inductive tuning portion 42 formed within the distributed tuning loop 43. The distributed tuning loop 43 allows for a lower frequency response to be obtained without increasing the size of the antenna structure.

Figure 5:
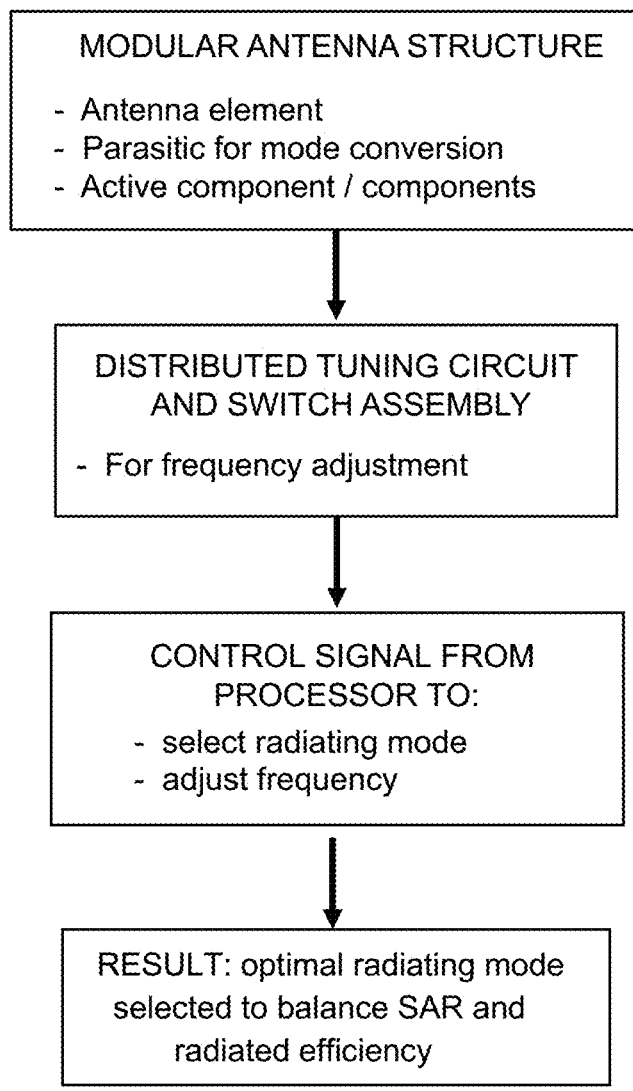
FIG. 5 describes a modular SAR antenna solution where a modular antenna element is connected or coupled to a tuning circuit.

FIG. 5 describes a modular SAR antenna solution where a modular antenna element including a parasitic element is connected or coupled to a tuning circuit. The tuning circuit contains one or multiple active components, such as switches, which provide two or more tuning states from the combination of the modular antenna element and tuning circuit. A control signal is generated in a processor and is used to select a radiating mode of the antenna which balances SAR and radiating efficiency.

Figure 6:
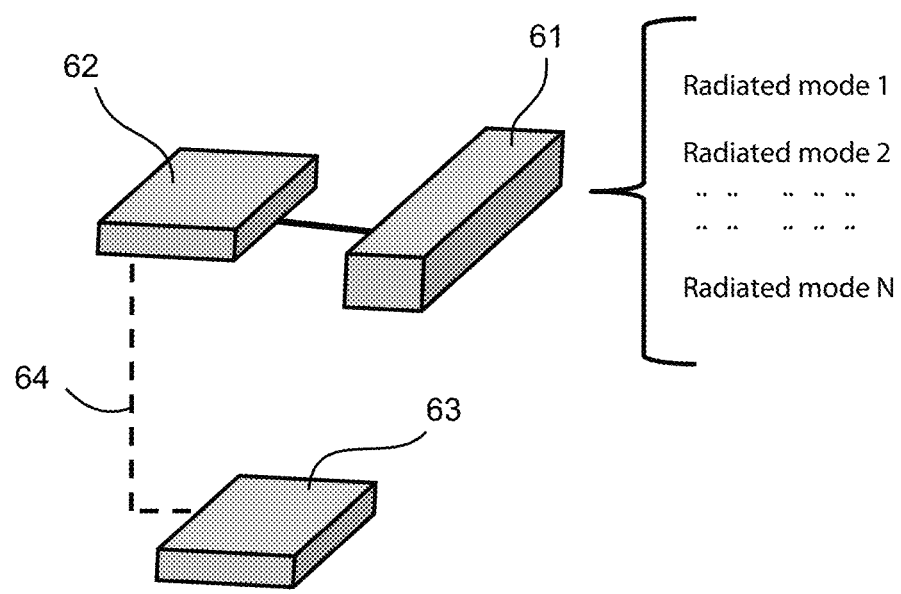
FIG. 6 shows an example of the modular SAR antenna solution, wherein a modular antenna element is connected or coupled to a tuning circuit and the antenna is configured to radiate about multiple modes.

FIG. 6 shows a modular SAR antenna solution wherein a modular antenna element 61 is connected or coupled to a tuning circuit and switch assembly 62. The antenna 61 is configured for radiating about multiple tuning states, or "modes". The tuning circuit and switch assembly 62 contains one or more active components, such as switches, which provide two or more tuning states from the combination of the modular antenna element 61 and tuning circuit assembly 62. A control signal 64 is generated in a processor 63 and is used to select a radiating mode of the antenna 61 as a result of configuring the tuning circuit assembly 62.

Figure 7A:
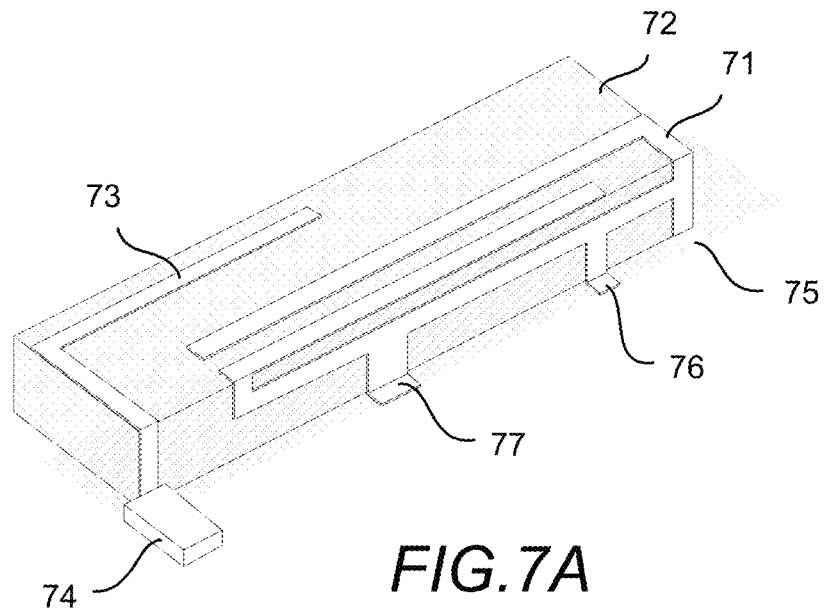
FIG. 7A shows an antenna structure for SAR management in accordance with one embodiment.
Figure 7B:
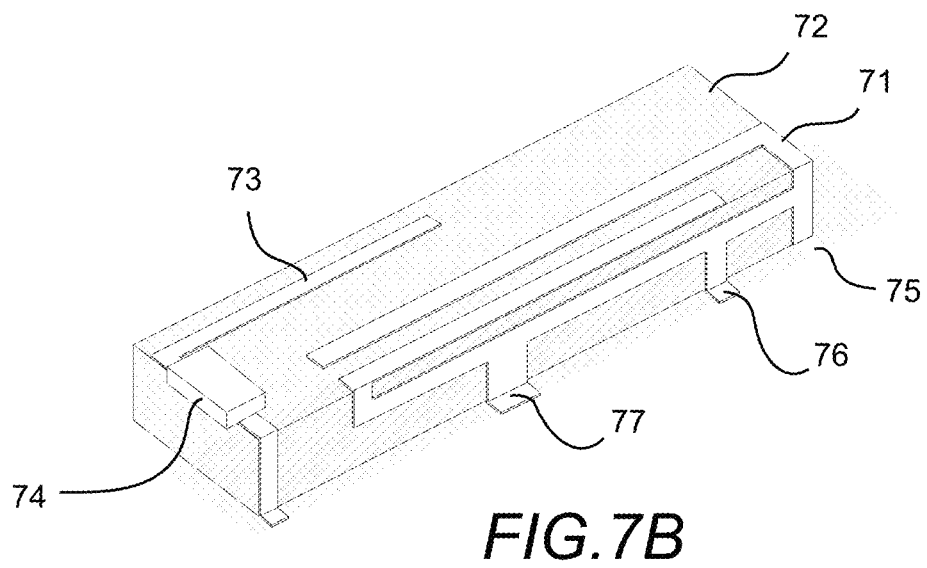
FIG. 7B shows a modular antenna structure for SAR management in accordance with another embodiment.

FIG. 7A shows an antenna structure for SAR management in accordance with one embodiment. An IMD antenna radiating element 71 along with a parasitic element 73 are each attached to a dielectric support substrate 72. The parasitic element 73 is positioned in proximity and configured to couple with the radiating element. A switch 74 is used to vary the reactance of the parasitic element at the junction of the parasitic and ground plane. FIG. 7B shows a configuration wherein the switch is integrated onto the dielectric support substrate 72, to make a modular antenna assembly. The antenna radiating element is shown including a feed connection 75, a first ground connection 76, and a second ground connection 77. Although a switch is described, any active component can be implemented in place of the switch.

FIGS. 8(A-D) illustrate current distributions on the IMD antenna and the parasitic of FIGS. 7(A-B) for two different modes of excitation. Current distributions on the ground plane are also shown for the two modes. FIG. 8A shows current distributions on the IMD antenna and the parasitic element from a side view, with the antenna in a first mode of excitation, wherein the parasitic element is open circuited. FIG. 8B shows current distributions on the IMD antenna and the parasitic element from a side view, with the antenna in a second mode of excitation, wherein the parasitic element is short circuited to ground. FIG. 8C shows current distributions on the IMD antenna and the parasitic element from a top view, with the antenna in the first mode of excitation wherein the parasitic element is open circuited. FIG. 8D shows current distributions on the IMD antenna and the parasitic element from a top view, with the antenna in the second mode of excitation wherein the parasitic element is short circuited.

Figure 9:
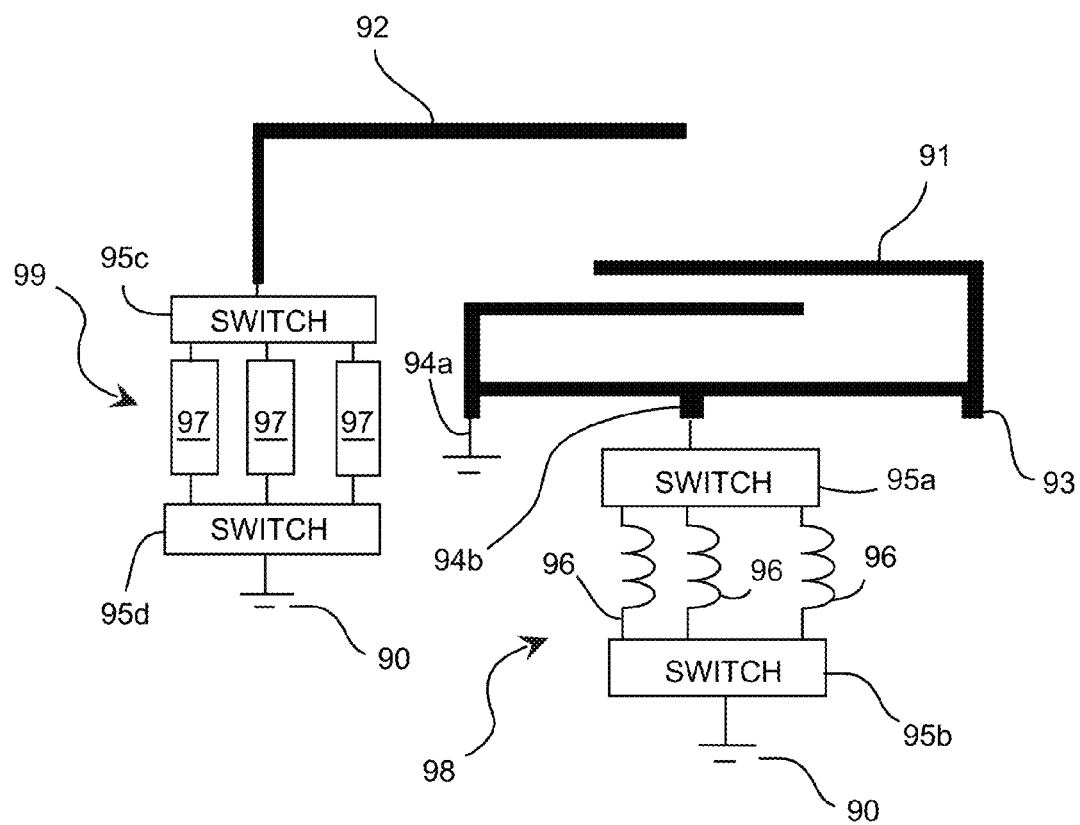
FIG. 9 shows an antenna configuration for SAR management where an IMD antenna is positioned in close proximity to a parasitic element, and the antenna comprises a switch assembly configured to alter the inductive loading between the ground connection on the antenna and ground.

FIG. 9 illustrates an antenna configuration for SAR management where an M-type IMD antenna 91 is positioned in close proximity to a parasitic element 92. The antenna comprises a first switch assembly 98 connected to the variable ground connection 94*b* of the antenna, and further comprises a feed point 93, and a static ground connection 94*a* as depicted. The first switch assembly 98 comprises a plurality of inductors 96 switchably configured between a first switch 95*a* that is coupled to the variable ground connection 94*b* of the IMD antenna, and a second switch 95*b* that is connected to ground. The first switch assembly 98 provides the ability to alter the inductive loading between the variable ground connection 94*b* on the antenna and ground 90. A second switch assembly 99 is connected to the parasitic element 92 and ground 90. The second switch assembly 99 comprises a plurality of lumped reactance components 97 switchably configured between third switch 95*c* that is coupled to the parasitic element and fourth switch 95*d* that is coupled to ground. The second switch assembly provides the ability to alter the reactive load at the parasitic/ground junction.

Figure 10:
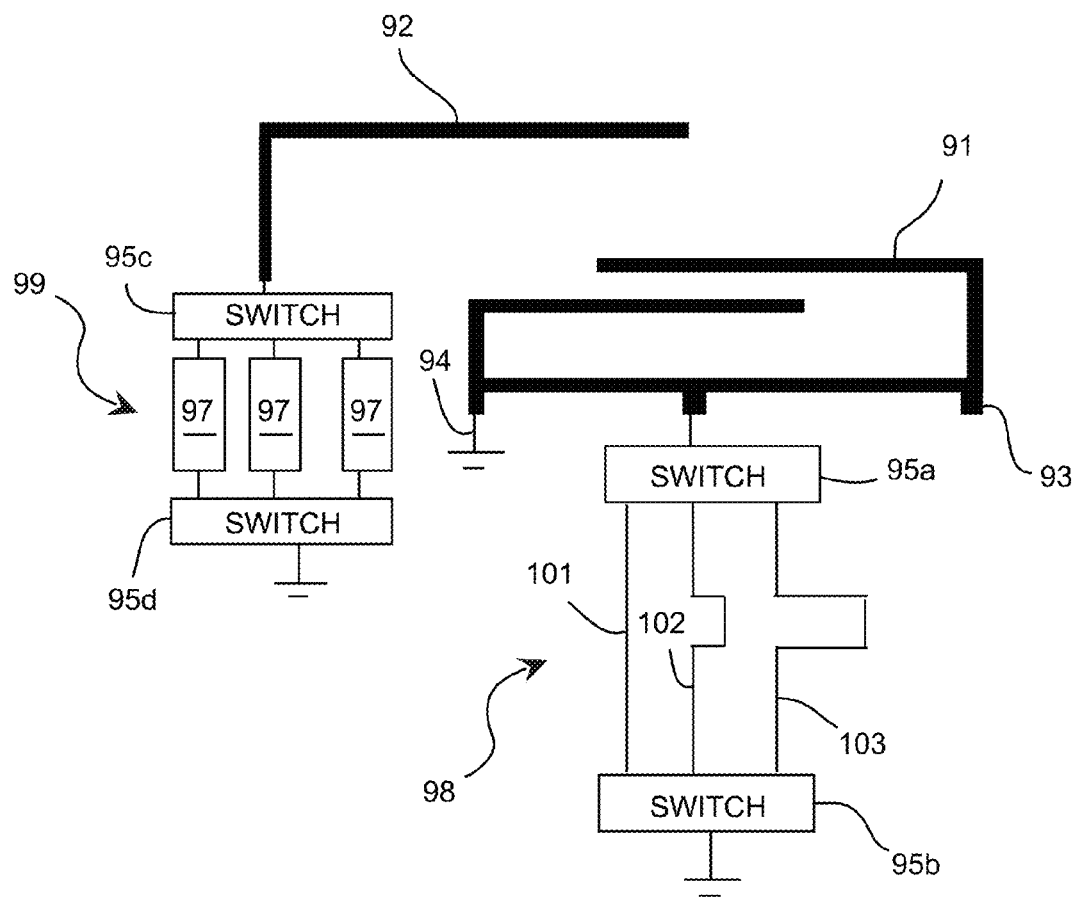
FIG. 10 shows an antenna configuration for SAR management where an IMD antenna is positioned in close proximity to a parasitic element, and the antenna comprises a first switch assembly configured to alter the electrical delay between the ground connection on the antenna and ground.

FIG. 10 illustrates an antenna configuration for SAR management where an IMD antenna 91 is positioned in close proximity to a parasitic element 92. The IMD antenna 91 has a first switch assembly 98 connected to the variable ground connection 94*b*, the first switch assembly includes a plurality of electrical delay lines 101; 102; 103, thereby providing the ability to alter the electrical delay between the ground connection on the antenna and ground. The antenna further includes a feed point 93, and a fixed ground connection 94*a*. A second switch assembly 99 is connected to the parasitic and ground, providing the ability to alter the reactive load at the parasitic/ground junction. In this embodiment, the first switch assembly 104 comprises a plurality of electrical delay lines 101; 102; 103 positioned between a first switch 95*a* that is connected to the variable ground connection of the IMD antenna and a second switch 95*b* that is further connected to ground.

Figure 11:
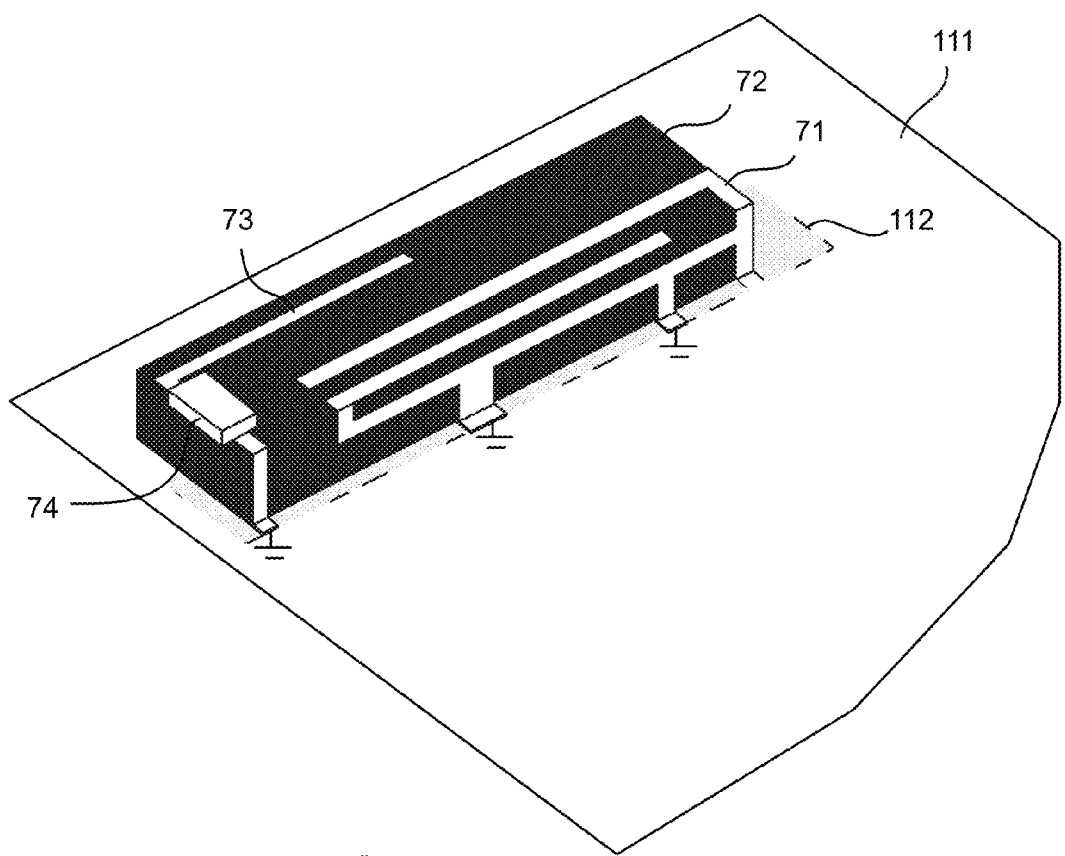
FIG. 11 shows an antenna configuration for SAR management where an IMD antenna, parasitic element, and active component are integrated into a dielectric substrate to form a modular assembly, and a portion of the ground plane beneath the antenna assembly is removed.

FIG. 11 illustrates an antenna configuration for SAR management where an IMD antenna radiating element 71, parasitic element 73, and active component 74 are integrated into a dielectric substrate 72 to form a modular antenna assembly. The active component is configured to vary a reactive loading of the parasitic element coupled to the IMD antenna. A portion of the ground plane 111 that is beneath the antenna assembly is removed forming a ground plane aperture 112. The radiating element is configured to excite the ground plane aperture, which in turn radiates an electromagnetic signal.

Figure 12:
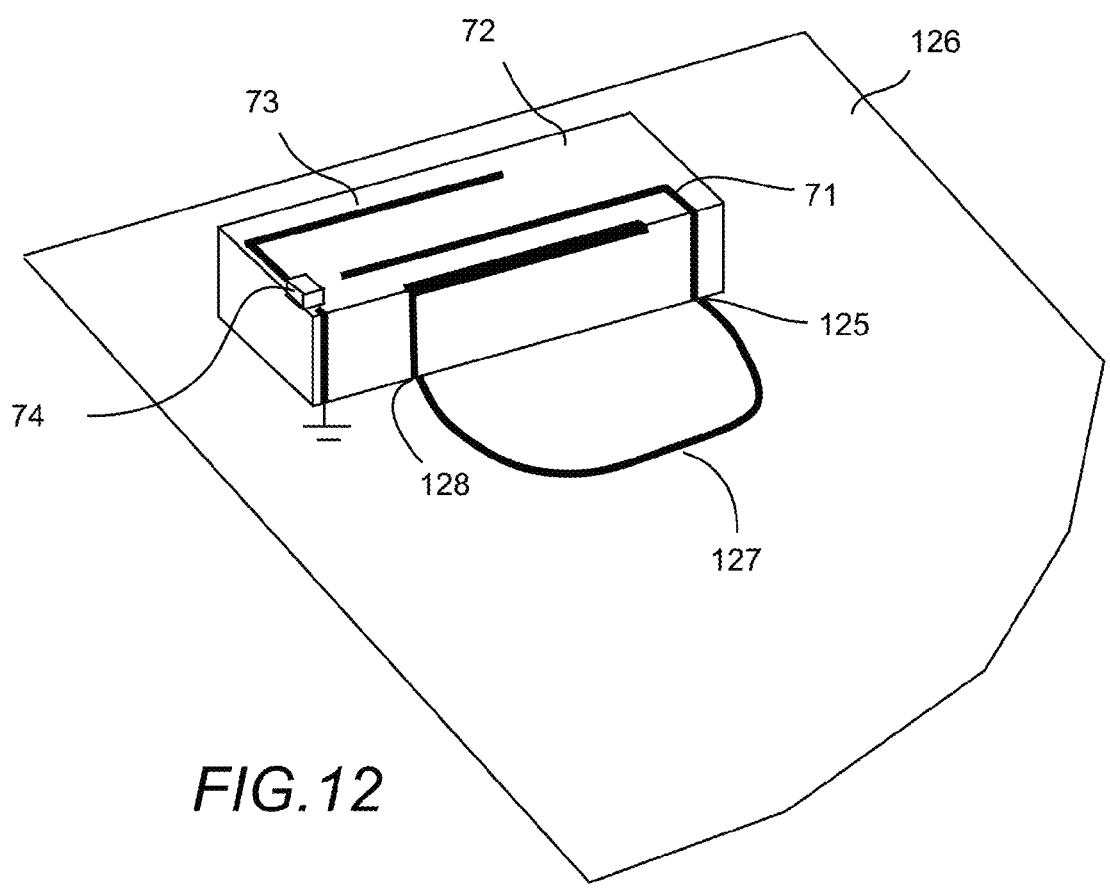
FIG. 12 shows an antenna configuration for SAR management where an IMD antenna, parasitic element, and active component are integrated into a dielectric substrate to form a modular assembly, and a delay line is integrated into the antenna at the circuit board.

FIG. 12 illustrates an antenna configuration for SAR management where an IMD antenna radiating element 71, parasitic element 73, and active component 74 are integrated into a dielectric substrate 72 to form a modular antenna assembly. A delay line 127 is integrated into the circuit board 126 that the antenna assembly is attached to, with the delay line connected to the feed point 125 of the antenna element and a ground connection 128.

Figure 13:
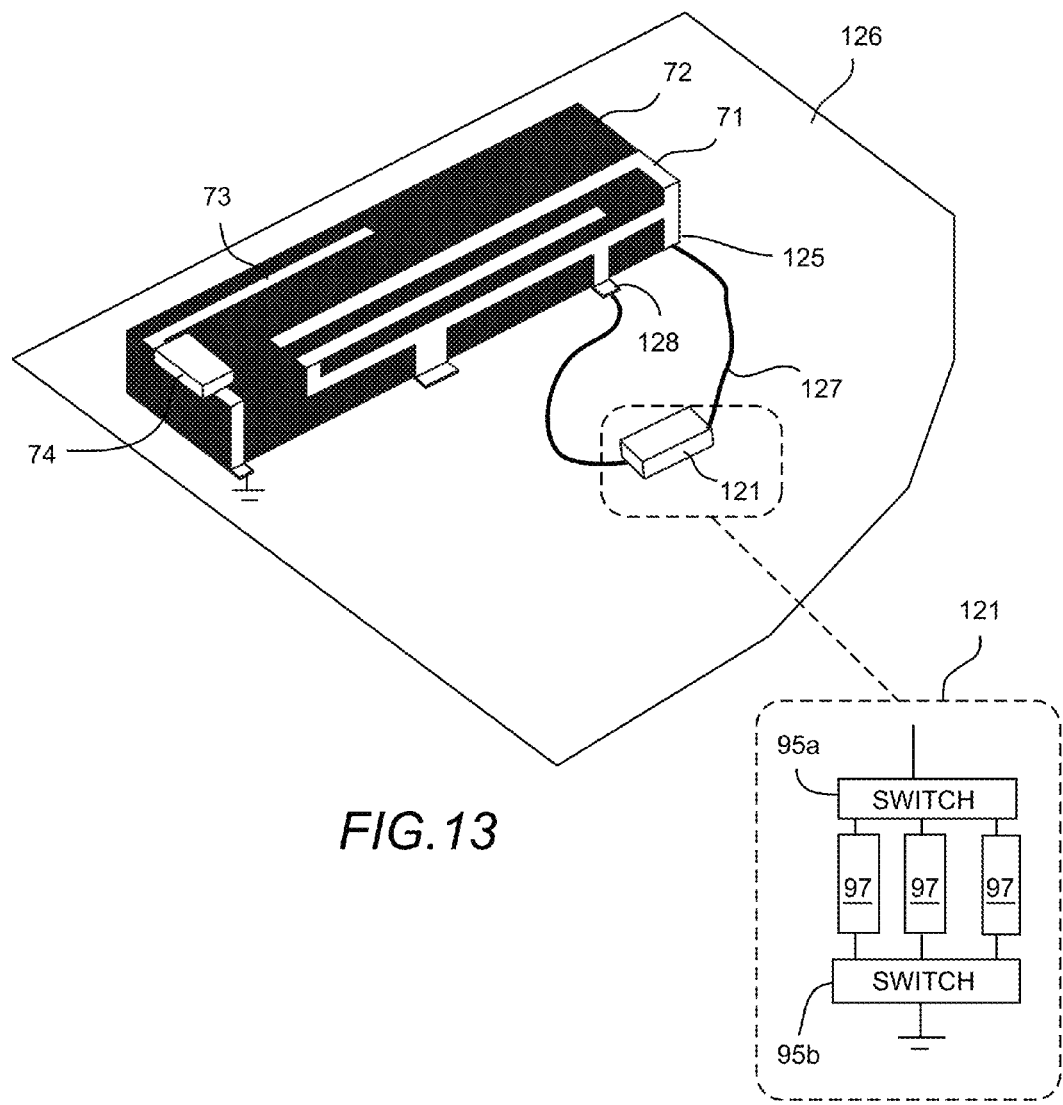
FIG. 13 shows an antenna configuration for SAR management where an IMD antenna, parasitic element, and active component are integrated into a dielectric substrate to form a modular assembly, wherein a delay line and switch assembly are integrated into the antenna at the circuit board.

FIG. 13 illustrates an antenna configuration for SAR management where an IMD antenna radiating element 71, parasitic element 73, and active component 74 are integrated into a dielectric substrate 72 to form a modular assembly. The active component provides the ability to adjust a reactive loading of the parasitic element. A delay line 127 is integrated into the circuit board 126 that the antenna assembly is attached to, with the delay line connected to the feed point 125 of the antenna element 71 and a ground connection 128. A switch assembly 121 having switches 95*a*; 95*b* thereof configured to switch in various reactive loads 97 to the delay line 127 is connected to the delay line thereby providing an ability to adjust the frequency response of the antenna.

Figure 14:
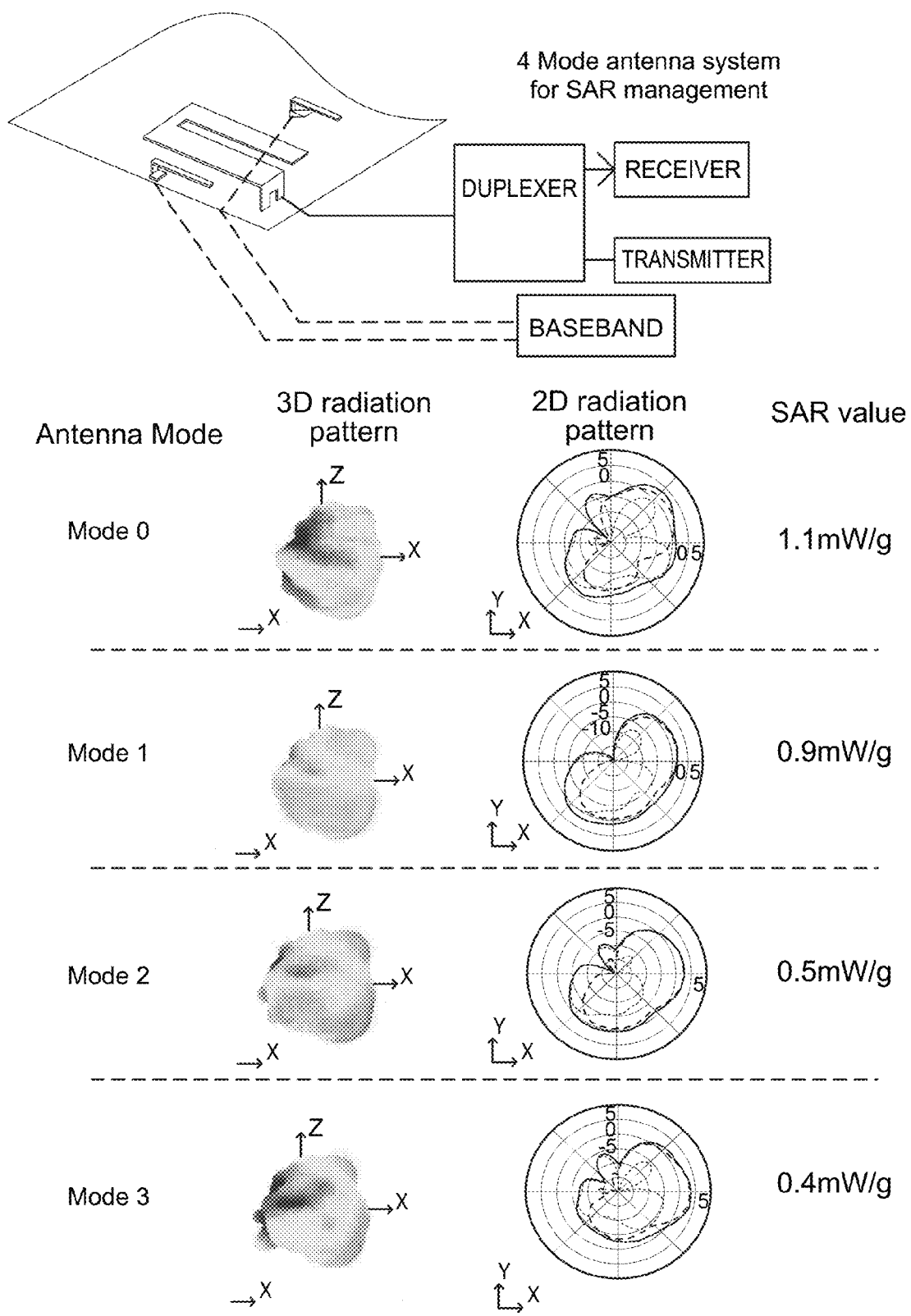
FIG. 14 shows an alternate antenna topology configured to generate four unique radiating modes, wherein 2D and 3D radiation patterns are shown for each mode along with the SAR value for the mode when the antenna configuration and ground plane are positioned in close proximity to a phantom test head.

FIG. 14 shows an alternate antenna topology wherein an IMD antenna element and two parasitic elements, the first parasitic element offset from the IMD antenna, and the second parasitic positioned under the IMD antenna, are configured on a ground plane. A pair of four port switches are connected to the two parasitic elements and reactive loads are placed on the switch ports; the common switch port is connected to the parasitic element. Four unique radiating modes are generated from this antenna configuration. 2D and 3D radiation patterns are shown for each mode (Mode 0; Mode 1; Mode 2; and Mode 3) along with the SAR value for the corresponding mode when the antenna configuration and ground plane are positioned in close proximity to a phantom test head.

Figure 15:
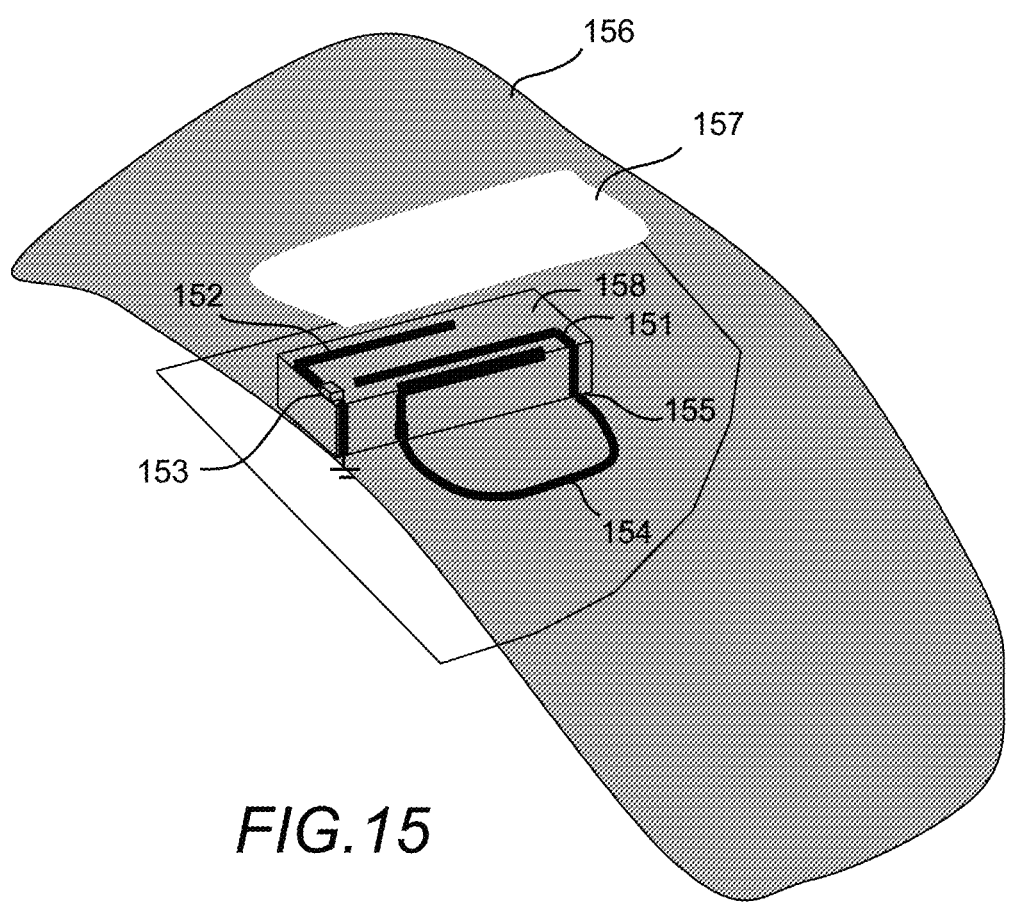
FIG. 15 shows an antenna assembly configured to excite an opening in a conductive surface.

FIG. 15 illustrates an antenna system where an IMD antenna radiating element 151, parasitic element 152, and active component 153 are integrated onto a dielectric substrate 158 to form a modular antenna assembly. A delay line 154 is shown coupled to feed and ground connections of the antenna radiating element. A conductive surface 156, such as a metal housing of a cell phone for example, is positioned in proximity to the antenna assembly. An opening 157 is formed in the conductive surface by removing conductive material. The antenna assembly will excite the opening in the conductive surface, which will in turn radiate.

In various embodiments, an antenna system comprises: an antenna element; a first conductor positioned in proximity to the antenna element; and an antenna tuning circuit containing one or multiple active components. The first port of the antenna tuning circuit connected to the first conductor and the second port connected to ground. The active component or components in the antenna tuning circuit are adjusted to change the impedance loading of the first conductor. The combination of the antenna element, first conductor, and antenna tuning circuit with active component or components provides the capability of generating two or more radiating modes. The two or more radiating modes generate different near-field characteristics of the radiated electromagnetic field.

In certain embodiments, an additional active component, or several active components, are connected to the antenna element. The active component or components are used to alter the frequency response and or the impedance of the antenna.

The antenna element selected may comprise an isolated magnetic dipole (IMD) element. Alternatively, the antenna element may comprise a monopole, dipole, planar inverted F antenna (PIFA), inverted F antenna (IFA), loop antenna, coil, meanderline, or other antenna element known in the art.

An additional active component or components may be connected to the IMD antenna element. The active component or components are used to alter the frequency response and or the impedance of the antenna.

In various other embodiments, an antenna system comprises: an antenna radiating element; a first conductor positioned in proximity to the antenna element; and an antenna tuning circuit containing one or multiple active components. A first port of the antenna tuning circuit is connected to the first conductor and the second port connected to ground. The active component or components in the antenna tuning circuit are adjusted to change the impedance loading of the first conductor. A portion of ground plane beneath the antenna element or in proximity to the antenna element is removed; the shape and dimensions of the area of ground removal can form an enclosed area or can form an area that is not enclosed. With the active tuning circuit in an operating state such that the first conductor is not connected to ground, the antenna element excites the aperture formed in the ground plane. The combination of the antenna element and aperture form the radiator for this first mode of radiation.

With the active tuning circuit in an operating state such that the first conductor is connected to ground, the antenna element excites the first conductor along with the aperture formed in the ground plane. The antenna element, first conductor, and/or aperture collectively form the radiator for this second mode of radiation. The combination of the antenna element, first conductor, and antenna tuning circuit with active component or components provides the capability of generating two or more radiating modes. The two or more radiating modes possess different near-field characteristics of the radiated electromagnetic field.

In yet another embodiment, an antenna system comprises: an antenna element; a first conductor positioned in proximity to the antenna element; and an antenna tuning circuit containing one or multiple active components. The first port of the antenna tuning circuit connected to the first conductor and the second port connected to ground. The active component or components in the antenna tuning circuit are adjusted to change the impedance loading of the first conductor. A portion of a conductive surface in proximity of the antenna element or in proximity to the antenna element is removed; the shape and dimensions of the area of formed by removing conductive material can form an enclosed area or can form an area that is not enclosed.

With the active tuning circuit in an operating state such that the first conductor is not connected to ground, the antenna element excites the aperture formed in the conductive surface. The combination of the antenna element and aperture form the radiator for this first mode of radiation.

With the active tuning circuit in an operating state such that the first conductor is connected to ground, the antenna element excites the first conductor along with the aperture formed in the conductive surface. The antenna element, first conductor, and/or aperture collectively form the radiator for this second mode of radiation.

The combination of the antenna element, first conductor, and antenna tuning circuit with active component or components provides the capability of generating two or more radiating modes. The two or more radiating modes possess different near-field characteristics of the radiated electromagnetic field.

In various embodiments, an algorithm that selects the optimal radiating mode from a multi-mode antenna to manage SAR. Inputs from proximity or other sensors integrated into the device are analyzed and used to select the optimal mode from a data base of measured or calculated SAR values. The SAR values populating the data base can be segregated by frequency, use case, and/or device loading condition.

In certain embodiments, the antenna element, first conductor, and one or multiple active components may be assembled onto a substrate to form a single piece module.

The active tuning elements further comprise a switch, FET, MEMS device, or a component that exhibits active capacitive or inductive characteristics, or any combination of these components.

We claim:

1. A multi-mode antenna system configured to reduce specific absorption rate (SAR) and optimize antenna efficiency associated with the antenna system, the antenna system comprising:
    a multi-mode antenna structure, the multi-mode antenna structure including:
        an antenna radiating element, the antenna radiating element comprising an antenna element having a feed connection, a fixed ground connection and an adjustable ground connection;
        and
        a first parasitic element positioned adjacent to the IMD element;
    the antenna system further comprising:
    an antenna tuning circuit coupled to the antenna structure with at least a first port of the antenna tuning circuit coupled to the first parasitic element and a second port of the antenna tuning circuit coupled to ground, the antenna tuning circuit including one or more active components, said one or more active components configured to change an impedance loading associated with the first parasitic element, wherein the combination of the antenna radiating element, first parasitic element, and antenna tuning circuit provides two or more antenna radiating modes associated with the multi-mode antenna structure, wherein each of the two or more radiating modes yields distinct near field characteristics of an electromagnetic field radiated by the antenna structure; and
    a processor coupled to the antenna tuning circuit, the processor configured to communicate control signals to the antenna tuning circuit, wherein upon receiving the control signals the antenna tuning circuit is configured to adjust the one or more active components for varying a mode of the multi-mode antenna structure;
    characterized in that:
    the antenna system is configured to determine a use case or loading associated with the device and communicate inputs to the processor;
    wherein the processor is further configured to receive the inputs, determine an optimal mode of the antenna system for reducing SAR and optimizing signal efficiency, and communicate the control signals to the antenna tuning circuit for reconfiguring the antenna system in the optimal mode.

2. The antenna system of claim 1, wherein the antenna radiating element is positioned above a ground plane;
    the first parasitic conductor element is disposed adjacent to the antenna radiating element;

the one or more active components including at least a first active component, wherein the first active component is coupled to the first parasitic element and further coupled to ground;
the first active component being configured to adjust a reactance associated with the parasitic conductor element for controlling the mode of the multi-mode antenna structure.

3. The antenna system of claim 2, wherein the first active component is contained within the antenna tuning circuit, and the first active component constitutes one of the one or more active components of the antenna tuning circuit.

4. The antenna system of claim 2, wherein the radiating element and the first parasitic element are combined with a dielectric substrate to form a modular antenna assembly.

5. The antenna system of claim 4, wherein the first active component is embedded within a volume of the modular antenna assembly.

6. The antenna system of claim 4, wherein the modular antenna assembly is attached to a circuit board, the ground plane being disposed on the circuit board, wherein a portion of the ground plane is removed at an area beneath the modular antenna assembly.

7. The antenna system of claim 6, wherein the removed portion of the ground plane forms an aperture configured to be excited by the antenna radiating element for radiating an electromagnetic signal.

8. The antenna system of claim 4, wherein the modular antenna assembly is attached to a circuit board, the ground plane being disposed on the circuit board, the circuit board further comprising a delay line, wherein the delay line is coupled to a ground connection and a feed connection of the antenna radiating element.

9. The antenna system of claim 8, wherein the delay line further comprises a switch assembly connected therebetween, the switch assembly including a firs switch, a second switch, and a plurality of lumped components each with a distinct reactive load thereof; wherein the switch assembly is configured to select from the plurality of lumped components for associating a reactive load with the delay line.

10. The antenna system of claim 8, wherein the modular antenna assembly is disposed within a metal housing of a wireless communication device, the housing including an opening disposed within the metal housing of the device and positioned adjacent to the modular antenna assembly, wherein the modular antenna assembly is configured to excite the opening which in turn radiates an electromagnetic signal therefrom.

11. The antenna system of claim 1,
characterized in that the multi-mode antenna structure further comprises:
a first switch assembly, the first switch assembly including: a first switch coupled to the adjustable ground connection of the IMD element at a first end, a second switch coupled to ground at a second end, and a plurality of inductive loads disposed between ports of the first and second switches; wherein the first switch assembly is configured to select from the plurality of inductive loads for coupling between the adjustable ground connection of the IMD element and said ground; and
a second switch assembly, the second switch assembly including: a third switch coupled to the first parasitic element, a fourth switch coupled to ground, and a plurality of lumped reactance components disposed between ports of the first and third switches; wherein the second switch assembly is configured to select from the plurality lumped components for coupling between the first parasitic element and said ground.

12. The antenna system of claim 1,
characterized in that the multi-mode antenna structure further comprises:
a first switch assembly, the first switch assembly including: a first switch coupled to the adjustable ground connection of the IMD element at a first end, a second switch coupled to ground at a second end, and a plurality of delay lines disposed between ports of the first and second switches; wherein the first switch assembly is configured to select from the plurality of delay lines for coupling between the adjustable ground connection of the IMD element and said ground; and
a second switch assembly, the second switch assembly including: a third switch coupled to the first parasitic element, a fourth switch coupled to ground, and a plurality of lumped reactance components disposed between ports of the first and third switches; wherein the second switch assembly is configured to select from the plurality lumped components for coupling between the parasitic conductor element and said ground.

13. The antenna system of claim 1, wherein the antenna system further comprises one or more proximity sensors each configured to sense a load about the device and communicate a load input to the processor; wherein the processor is further configured to receive the load input from the one or more proximity sensors, determine the optimal mode of the antenna system for reducing SAR and optimizing signal efficiency, and communicate the control signals to the antenna tuning circuit for reconfiguring the antenna system in the optimal mode.

14. The antenna system of claim 1, wherein the antenna is configured to select the optimal mode based on the frequency required of the antenna.

15. The antenna system of claim 1, wherein the antenna system is configured to select the optimal mode based on a use case of the device, wherein the use case includes one of: device held in hand, device held in lap, or device not held by a user.

16. A multi-mode antenna system configured to reduce specific absorption rate (SAR) and optimize antenna efficiency associated with the antenna system, the antenna system comprising:
a multi-mode antenna structure, the multi-mode antenna structure including:
an antenna radiating element, the antenna radiating element comprising an isolated magnetic dipole (IMD) antenna element having a feed connection, a fixed ground connection and an adjustable ground connection; and
a first parasitic element positioned adjacent to the IMD element;
the antenna system further comprising:
an antenna tuning circuit coupled to the antenna structure with at least a first port of the antenna tuning circuit coupled to the first parasitic element and a second port of the antenna tuning circuit coupled to ground, the antenna tuning circuit including one or more active components, said one or more active components configured to change an impedance loading associated with the first parasitic element, wherein the combination of the antenna radiating element, first parasitic element, and antenna tuning circuit provides two or more antenna radiating modes associated with the multi-mode antenna structure, wherein each of the two or more radiating modes yields distinct near field characteristics of an electromagnetic field radiated by the antenna structure; and a processor coupled to the antenna tuning circuit, the processor configured to communicate control signals to the antenna tuning circuit, wherein upon receiving the control signals the antenna tuning circuit is configured to adjust the one or more active components for varying a mode of the multi-mode antenna structure;

characterized in that:

the antenna system further comprises one or more proximity sensors each configured to sense a load about the device and communicate a load input to the processor;

wherein the processor is further configured to receive the load input from the one or more proximity sensors, determine an optimal mode of the antenna system for reducing SAR and optimizing signal efficiency, and communicate the control signals to the antenna tuning circuit for reconfiguring the antenna system in the optimal mode.

* * * * *